US006417594B1

(12) United States Patent
Kometani et al.

(10) Patent No.: US 6,417,594 B1
(45) Date of Patent: Jul. 9, 2002

(54) VEHICLE ALTERNATOR

(75) Inventors: Haruyuki Kometani; Toshiyuki Yoshizawa; Kyoko Higashino; Yoshihito Asao, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 8 days.

(21) Appl. No.: 09/637,003

(22) Filed: Aug. 14, 2000

(30) Foreign Application Priority Data

Feb. 16, 2000 (JP) ........................................ 2000-037887

(51) Int. Cl.[7] ................................................. H02K 1/00
(52) U.S. Cl. ........................................ 310/216; 310/254
(58) Field of Search ................................. 310/254, 216, 310/42, 168, 181; 29/596–598

(56) References Cited

U.S. PATENT DOCUMENTS 5,936,325 A * 8/1999 Permuy ...................... 310/162
6,023,119 A * 2/2000 Asao ........................... 310/216
6,034,464 A * 3/2000 Asao ........................... 310/263

FOREIGN PATENT DOCUMENTS

| JP | 4-26345 | 5/1985 | ............ H02K/1/16 |
| JP | 60-87639 | 5/1985 | ............ H02K/1/16 |
| JP | 411299131 A | * 10/1999 | |

* cited by examiner

Primary Examiner—Tran Nguyen
(74) Attorney, Agent, or Firm—Sughrue Mion, PLLC

(57) ABSTRACT

A concave portion 8a is provided at the tip in the axial central part of teeth in a stator 8.

5 Claims, 8 Drawing Sheets

◄── ROTATIONAL DIRECTION OF ROTOR

VEHICLE ALTERNATOR

BACKGROUND OF THE INVENTION

The present invention relates to a vehicle alternator, and more specifically to a stator structure thereof.

FIG. 9 is a side cross-sectional view of a conventional alternator, and FIG. 10 is a perspective view illustrating a rotor portion thereof.

This alternator comprises a case 33 composed of a front bracket 31 and a rear bracket 32 which are made of aluminum, a shaft 35 provided within a case 33 and having a pulley 34 secured at one end, a rotor 36 of lundell type secured to this shaft 35, fans 37 secured to both side faces of this rotor 36, a stator 38 fixed to an inner wall face within this case 33, a slip ring 39 fixed to the other end portion of the shaft 35 for supplying an electric current to the rotor 36, a pair of brushes 40 for scrubbing this slip ring 39, a brush holder 41 containing these brushes 40, a commutator 60 electrically connected to the stator 38 for rectifying the alternating current produced in the stator 38 to direct current, a heat sink 42 fitted into the brush holder 41, and a regulator 43 attached to this heat sink 42 for regulating the magnitude of alternating voltage produced in the stator 38.

The stator 38 comprises a stator core 44, and a stator coil 45 for generating an alternating current by changes of the magnetic flux from a rotor coil, as described below, along with the rotation of the rotor 36, with a conducting wire wound around this stator core 44.

The rotor 36 comprises a rotor coil 46 for producing the magnetic flux by passing the electric current, and a pole core 47, provided over this rotor coil 46, having the magnetic pole formed by the magnetic flux.

The pole core 47 is composed of a first pole core body 48 and a pole core body 49 which are paired and mated alternately. The first pole core body 48 and the pole core body 49 are constituted integrally of a plurality of claw-like magnetic pole pieces 50, 51 having a pawl shape which are disposed evenly around the peripheral portion thereof and project in one direction, with a thick disk-like bottom portion made of iron as a base. Adjacent claw-like magnetic pole pieces 50, 51 are disposed with a certain magnetic pole spacing H to prevent the magnetic flux from leaking between both pieces.

Since the conventional vehicle alternator is constituted as above, in a claw pole rotor-type alternator, a magnetic flux which passes from the rotor to the stator and is referred to as a leakage flux is routed over the inner peripheral surface of stator iron core along the axial direction into the opposite pole of the rotor. This is caused by virtue of the structure of claw pole, decreasing the magnetic flux that is effective for the generation of power, and lowering the output. Since it produces the pulsation of magnetic flux, it will fluctuate the generated voltage and disorder the output waveform, causing the ripple of generated voltage in the vehicle alternator, and the electromagnetic noise to occur to have a detrimental effect on the external apparatus.

The pulsation of magnetic flux over the inner peripheral surface of stator iron core might increase the fluctuation of magnetic exciting force at an air gap portion, deteriorating the electromagnetic sound which is produced due to resonance of the stator.

It should be noted that in the conventional example for decreasing the leakage flux as above described, there is an art of having two slots for every pole and every phase as disclosed in the Unexamined Japanese Patent Application Publication No. Hei 4-26345 publication, but it was difficult to perform the winding because of the multiple slots.

SUMMARY OF THE INVENTION

This invention has been achieved to resolve the above-mentioned problems, and an object of the invention is to provide a vehicle alternator which can provide the greater output, less ripple and less electromagnetic sound by reducing the leakage flux without providing multiple slots.

A vehicle alternator according to aspect 1 of this invention comprises a rotor provided within a case and having claw-like magnetic pole pieces, a stator fixed within the case, and a commutator electrically connected to the stator, wherein the magnetic reluctance of the axial central part of teeth in the stator is increased.

A vehicle alternator according to aspect 2 comprises a rotor provided within a case and having claw-like magnetic pole pieces, a stator fixed within the case, and a commutator electrically connected to the stator, wherein the magnetic flux passing cross section of the axial central part of teeth in the stator is decreased.

A vehicle alternator according to aspect 3 comprises a rotor provided within a case and having claw-like magnetic pole pieces, a stator fixed within the case, and a commutator electrically connected to the stator, wherein a concave portion is provided at the tip of the axial central part of teeth in the stator.

A vehicle alternator according to aspect 4 comprises a rotor provided within a case and having claw-like magnetic pole pieces, a stator fixed within the case, and a commutator electrically connected to the stator, wherein a recess portion is provided in the axial central part of teeth in the stator and on either forward or backward face in the rotational direction of the rotor.

A vehicle alternator according to aspect 5 comprises a rotor provided within a case and having claw-like magnetic pole pieces, a stator fixed within the case, and a commutator electrically connected to the stator, wherein a nonmagnetic material is provided in the axial central part of teeth in the stator.

DETAILED DESCRIPTION OF THE PREFERRED EMBODIMENTS

Embodiment 1

Figure 1:
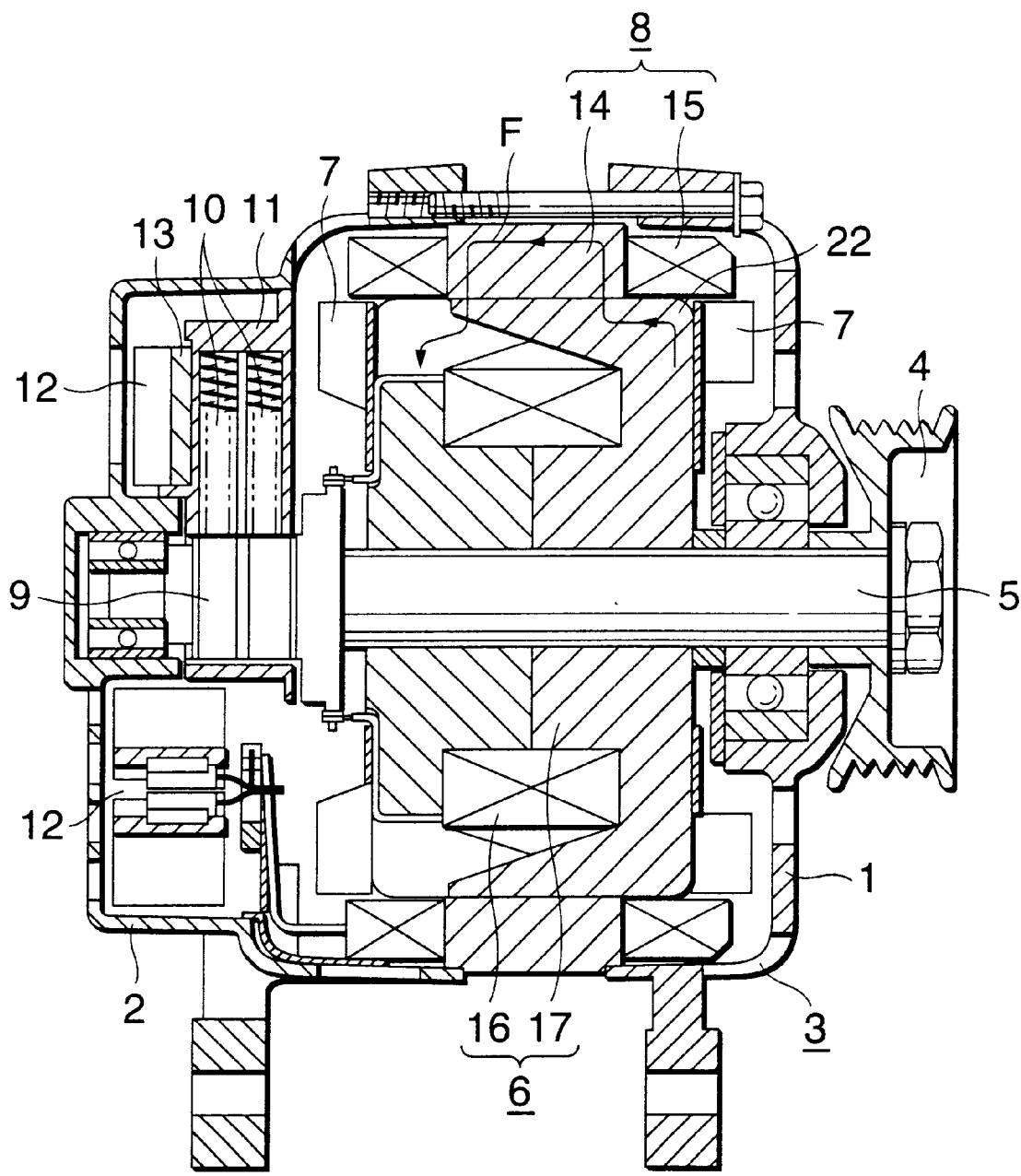
FIG. 1 is a side cross-sectional view illustrating a vehicle alternator according to an embodiment 1 of this invention.
Figure 2:
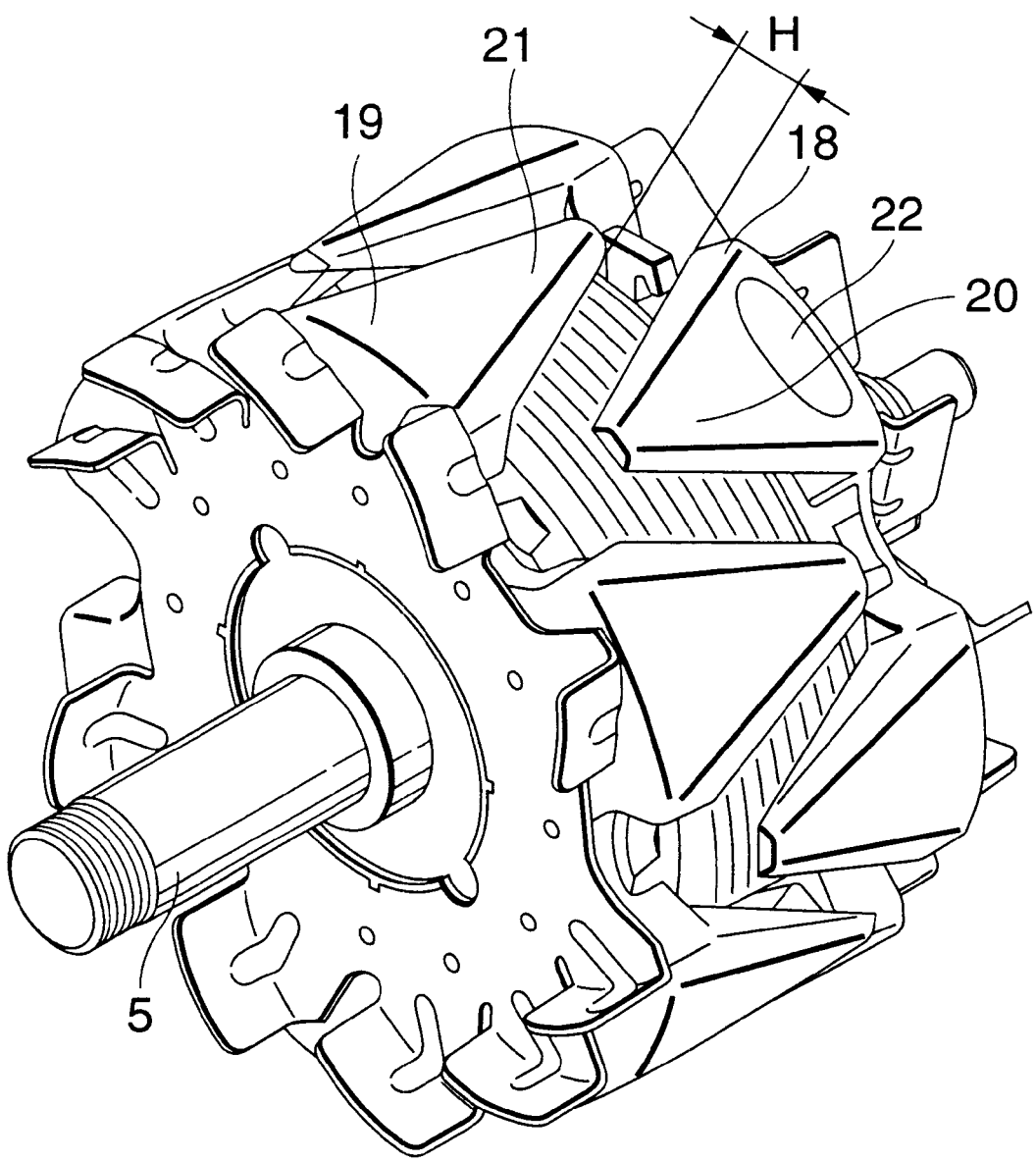
FIG. 2 is a perspective view showing a rotor portion.

FIG. 1 is a side cross-sectional view of a vehicle alternator according to one embodiment of this invention, and FIG. 2 is a perspective view illustrating a rotor portion thereof.

This alternator comprises a case 3 composed of a front bracket 1 and a rear bracket 2 which are made of aluminum, a shaft 5 provided within this case 3 and having a pulley 4 secured at one end, a rotor 6 of lundell type secured to this shaft 5, fans 7 secured to both side faces of this rotor 6, a stator 8 fixed to an inner wall face within the case 3, a slip ring 9, fixed to the other end portion of the shaft 5, for supplying an electric current to the rotor 6, a pair of brushes 10 for scrubbing this slip ring 9, a brush holder 11 containing the brushes 10, a commutator 30, electrically connected to the stator 8, for rectifying the alternating current produced in the stator 8 to direct current, a heat sink 12 fitted into the brush holder 11, and a regulator 13 attached to this heat sink 12 for regulating the magnitude of alternating voltage produced in a stator 8.

The stator 8 comprises a stator core 14, and a stator coil 15 for generating an alternating current by changes of the magnetic flux from a rotor coil, as described below, along with the rotation of the rotor 6, with a conducting wire wound around this stator core 14.

The rotor 6 comprises a rotor coil 16 for producing the magnetic flux by flowing the electric current, and a pole core 17 having a magnetic pole formed by this magnetic flux, provided over this rotor coil 16.

The pole core 17 is composed of a first pole core body 18 and a pole core body 19 which are paired and mated alternately. The first pole core body 18 and the pole core body 19 are constituted integrally of a plurality of claw-like magnetic pole pieces 20, 21 having a pawl shape which are disposed evenly around the peripheral portion and project in one direction, with a thick disk-like bottom portion made of iron as a base. Adjacent claw-like magnetic pole pieces 20, 21 are disposed with a certain magnetic pole spacing H to prevent the magnetic flux from leaking between both claws.

Figure 3:
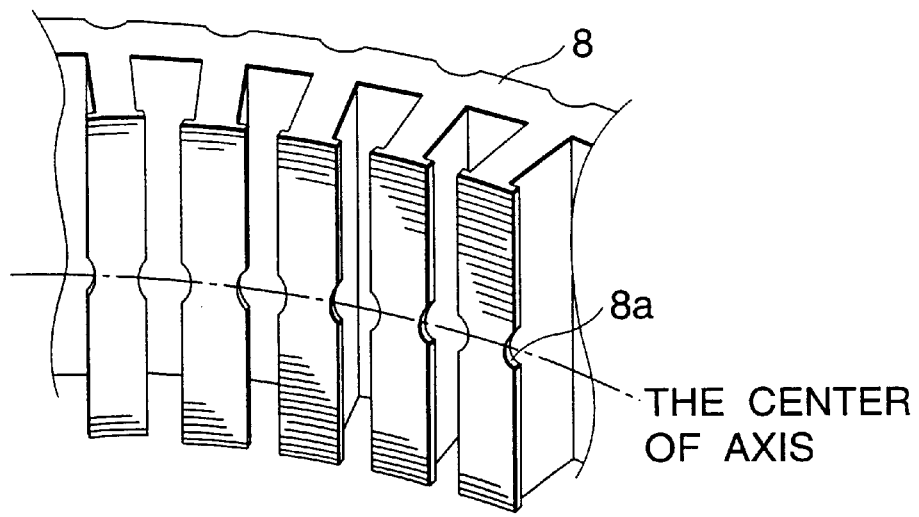
FIG. 3 is a perspective view showing a stator portion.

FIG. 3 is a perspective view of a stator iron core as seen from the center of axis, wherein a plurality of slot openings in the stator 8 have a greater width of openings near the axial center than other portions. As seen from the side of teeth, the axial central part of teeth is narrowed. In FIG. 3, a substantially circular concave portion 8a is provided, but it maybe of a substantially V-shape or the like, and is not limited to the shape as shown in FIG. 3, as far as it is narrower near the central part.

Figure 4:
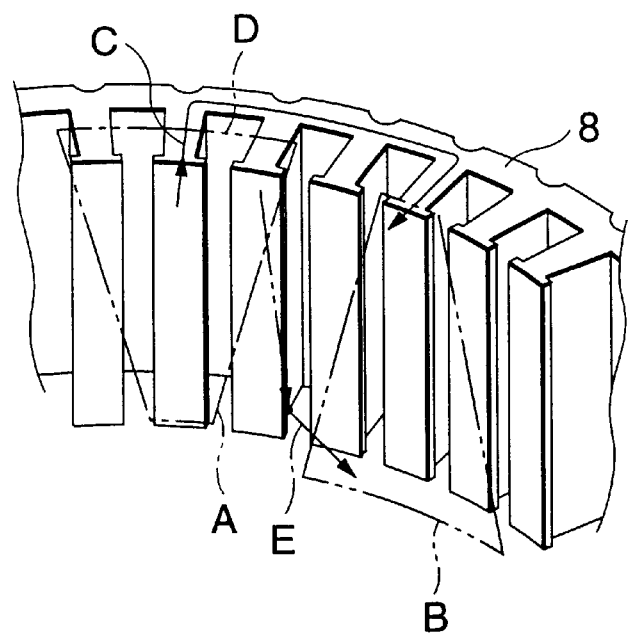
FIG. 4 is a perspective view showing a stator portion.

FIG. 4 is a perspective view of a conventional stator iron core, as seen from the center of axis. In FIG. 4, a magnetic flux C outgoing from a rotational magnetic pole piece A of the rotor 6 passes through the opposite teeth of A portion, a core back D, the opposite teeth of B portion back to an adjacent rotational magnetic pole piece B, in which a flux referred to as leakage flux E passes over the surface of teeth not to allow the magnetic flux from the rotor iron core to enter into the stator iron core and contribute to the power generation.

In the stator 8 of this embodiment, the magnetic reluctance is extended by a narrower magnetic path section of the central part in a magnetic path for this leakage flux to pass over the surface of teeth, so that the leakage flux is decreased, with the greater output. Also, in the relation of opposed arrangement between teeth and the claw-like magnetic pole pieces 20, 21, the concave portion 8a of teeth does not decrease a main magnetic flux F largely, because the main magnetic flux F passes near a base portion 22 of claw, whereby there is also the effect of reducing the leakage flux in this invention.

While the concave portion 8a is provided at the tip of the axial central part of teeth in FIG. 3, it will be appreciated that the concave portion may be provided at any portion of teeth.

Figure 5:
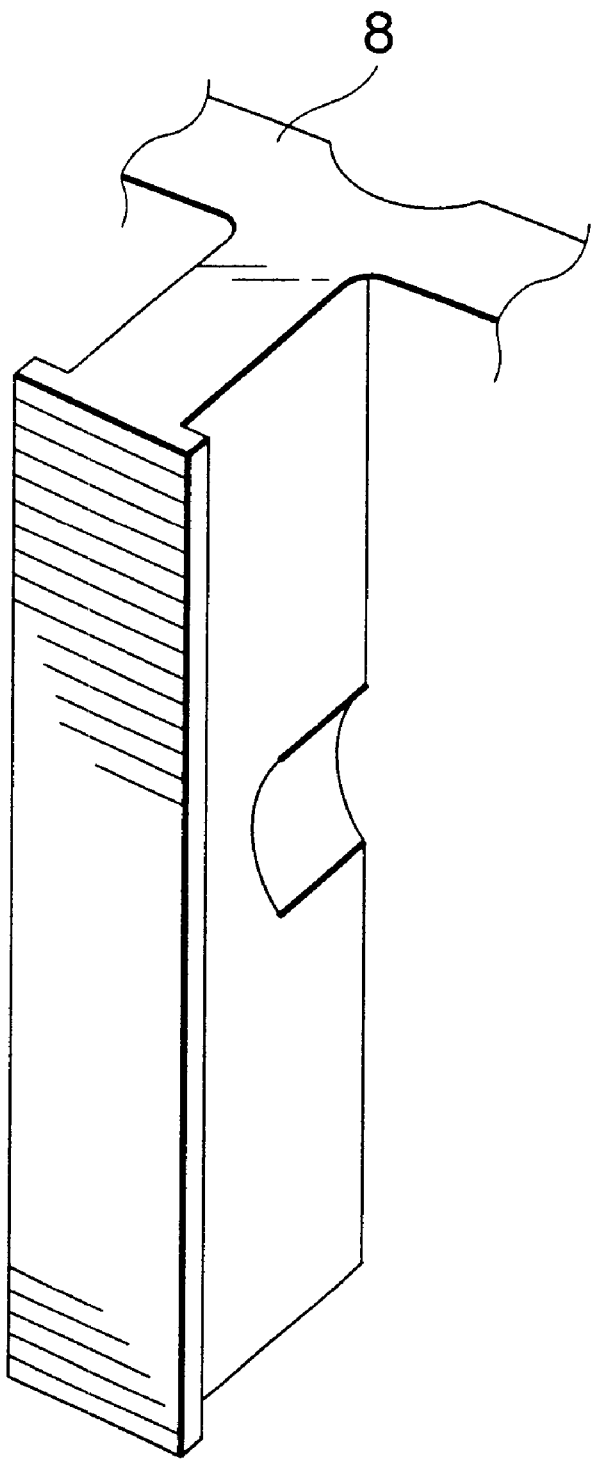
FIG. 5 is a perspective view showing a stator portion.
Figure 6:
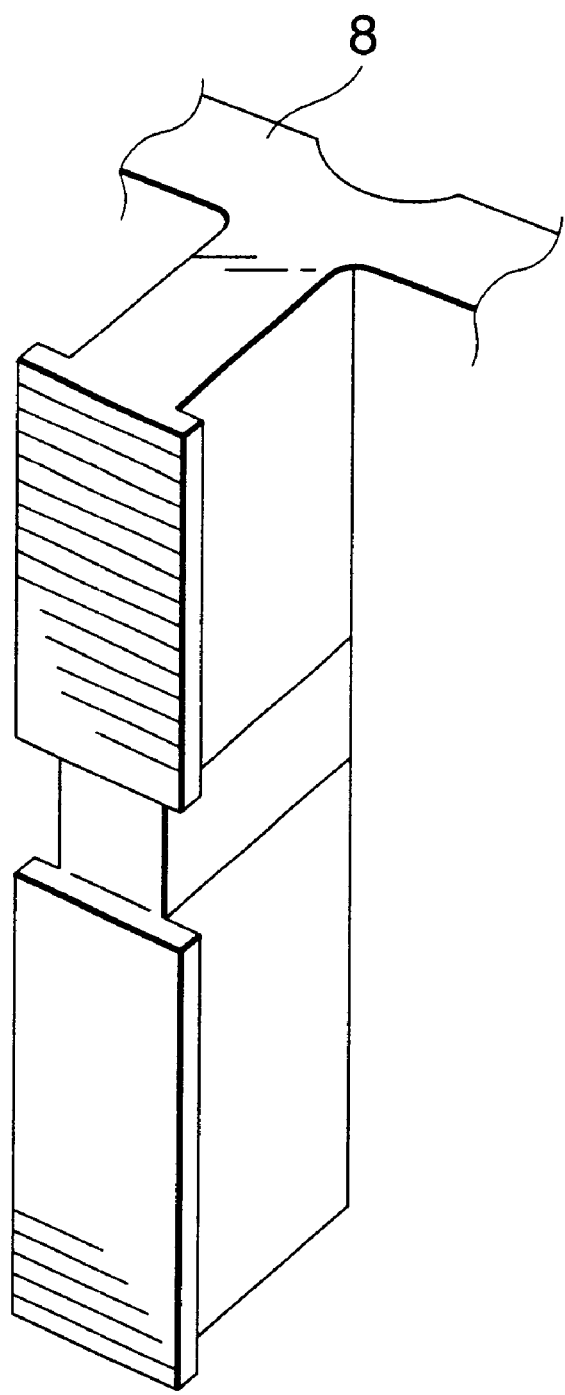
FIG. 6 is a perspective view showing a stator portion.

Further, a concave portion may be provided in the axial central part of teeth, other than at the tip, as shown in FIG. 5, or the cross section through which the magnetic flux in the axial central part of teeth passes may be decreased, as shown in FIG. 6. That is, it does not matter whatever shape may be used, as far as the magnetic reluctance in the axial central part of teeth is increased.

With the above constitution, the field leakage flux will pass through the teeth portion of stator having partially increased magnetic reluctance, whereby the leakage flux is decreased, resulting in the enhanced output, reduced ripple, and reduced electromagnetic sound.

Embodiment 2

Figure 7:
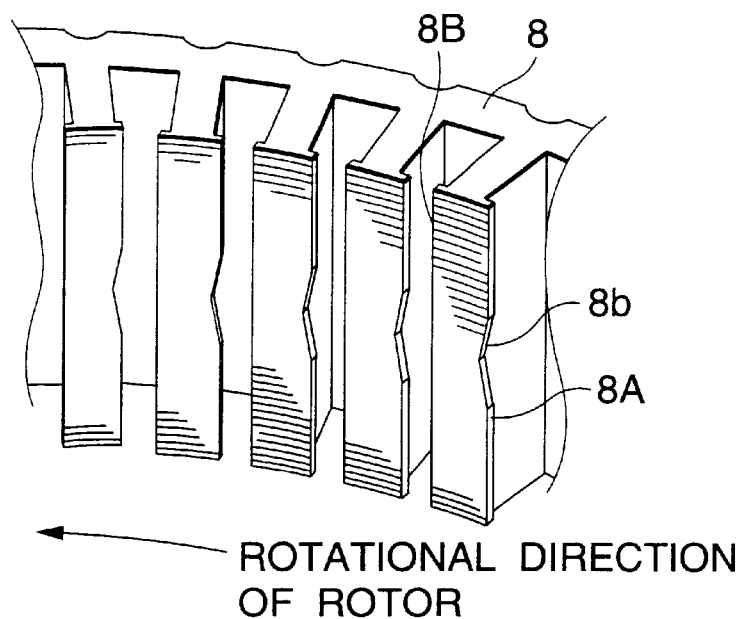
FIG. 7 is a perspective view showing a stator portion according to an embodiment 2 of this invention.

FIG. 7 is a perspective view of a stator iron core according to an embodiment 2 of this invention, as seen from the side of axial center. In this embodiment, a recess portion 8b is provided only on a backward face 8A in the rotational direction of rotor which is peripherally located in a slot central portion. This narrow magnetic path portion which is deflected peripherally is shaped to have the narrower width of teeth closer to the axial center, so that only the backward face is narrowed gradually, with a forward face 8B of teeth in the rotational direction of rotor as conventional.

Thereby, since the claw-like magnetic pole pieces which are tapered and the teeth are inclined in the same direction, backward of the rotation, the area of opposed faces of teeth to the rotor 6 is not reduced, as compared with the embodiment 1, so that the decrease in the main magnetic flux can be suppressed.

That is, since the magnetomotive force by the rotor 6 is more distributed on the backward face 8A, there is a significant effect of reducing the leakage flux with the less decrease in main flux by providing the recess portion 8b on the backward face 8A, resulting in further enhanced output.

While the recess portion 8b is provided on the backward face 8A in the above embodiment, it should be note that the recess portion may be provided only on the forward face 8B. In this case, however, the effect of reducing the leakage flux is diminished.

Embodiment 3

Figure 8:
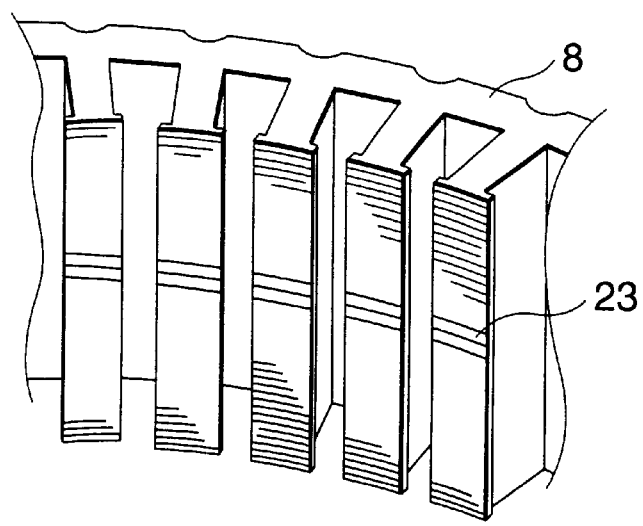
FIG. 8 is a perspective view showing a stator portion according to an embodiment 3 of this invention.
Figure 9:
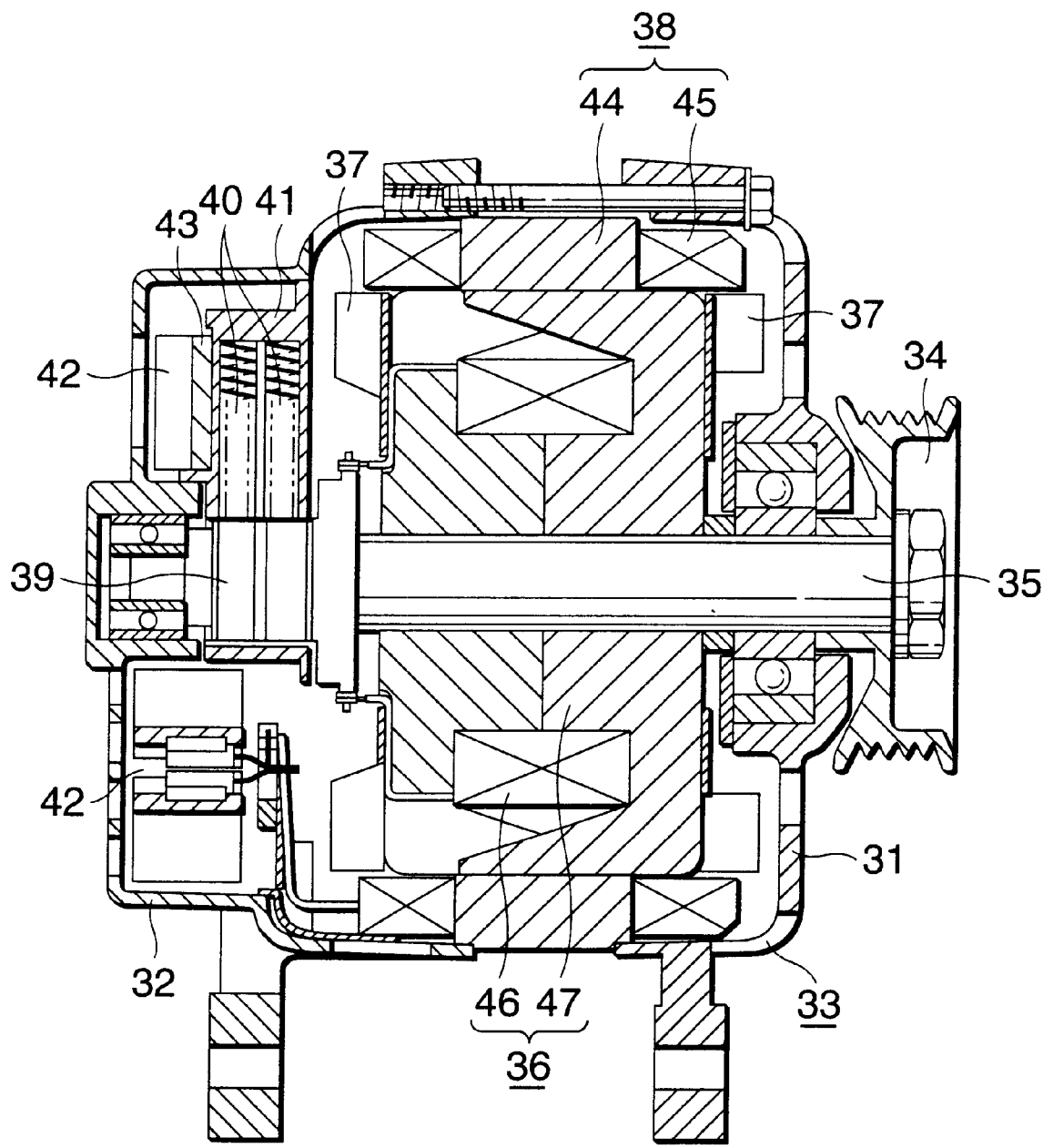
FIG. 9 is a side cross-sectional view showing a conventional vehicle alternator.
Figure 10:
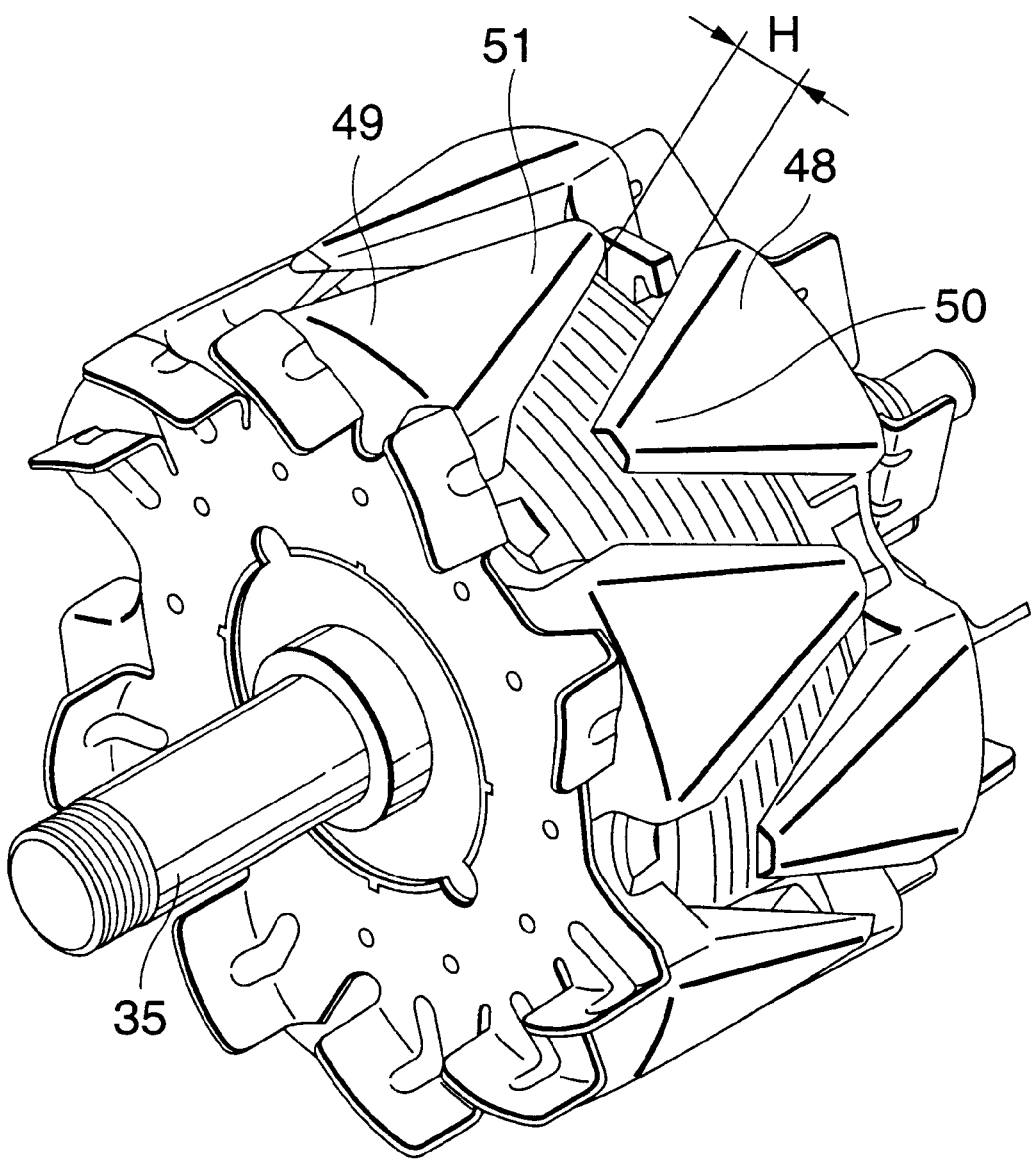
FIG. 10 is a perspective view showing a conventional rotor.

FIG. 8 is a perspective view of a stator iron core according to an embodiment 3 of this invention, as seen from the side of axial center. In the figure, a nonmagnetic material 23 made of stainless is provided in the axial central part of teeth. Thereby, it is possible to have the increased magnetic reluctance, like the embodiments 1, 2, and take the same effect.

A vehicle alternator according to any one of aspects 1 to 3 and aspect 5 comprises a rotor provided within a case and having claw-like magnetic pole pieces, a stator fixed within the case, and a commutator electrically connected to this stator, wherein the magnetic reluctance of the axial central part of teeth in the stator is increased, thereby reducing the leakage flux, with the enhanced output, reduced ripple and reduced electromagnetic sound.

A vehicle alternator according to aspect 4 of this invention comprises a rotor provided within a case and having claw-like magnetic pole pieces, a stator fixed within the case, and a commutator electrically connected to this stator, wherein a recess portion is provided in the axial central part of teeth in the stator and on either forward or backward face in the rotational direction of rotor, whereby the pulsation of magnetic flux is further decreased, resulting in less high frequency components which are a source of high frequency noise, and less undesired sound.

What is claimed is:

1. A vehicle alternator, comprising:
   a rotor provided within a case and having claw-like magnetic pole pieces,
   a stator fixed within said case and having axially extending teeth,
   a commutator electrically connected to said stator, and
   means for increasing a magnetic reluctance at a lengthwise central part of said stator teeth.

2. A vehicle alternator, comprising:
   a rotor provided within a case and having claw-like magnetic pole pieces,
   a stator fixed within said case and having axially extending teeth,
   a commutator electrically connected to said stator, and
   means for decreasing a magnetic flux passing a cross section of said stator teeth at a lengthwise central part of said teeth.

3. A vehicle alternator, comprising:
   a rotor provided within a case and having claw-like magnetic pole pieces,
   a stator fixed within said case and having axially extending teeth,
   a commutator electrically connected to said stator, and
   a concave portion provided at a lengthwise central part of said stator teeth.

4. A vehicle alternator, comprising:
   a rotor provided within a case and having claw-like magnetic pole pieces,
   a stator fixed within said case and having axially extending teeth,
   a commutator electrically connected to said stator, and
   a recess portion provided at a lengthwise central part of said stator teeth.

5. A vehicle alternator, comprising:
   a rotor provided within a case and having claw-like magnetic pole pieces,
   a stator fixed within said case and having axially extending teeth,
   a commutator electrically connected to said stator, and
   a nonmagnetic material is provided at a lengthwise central part of said stator teeth.

* * * * *